Oct. 19, 1926.

W. H. STARK 1,603,993

AUTO FIELD MACHINE

Filed Oct. 16, 1922      3 Sheets-Sheet 1

INVENTOR.
William H. Stark.
BY James P. Townsend
ATTORNEY.

Witness:
W. M. Gentle.

Oct. 19, 1926.
W. H. STARK
1,603,993
AUTO FIELD MACHINE
Filed Oct. 16, 1922     3 Sheets-Sheet 2
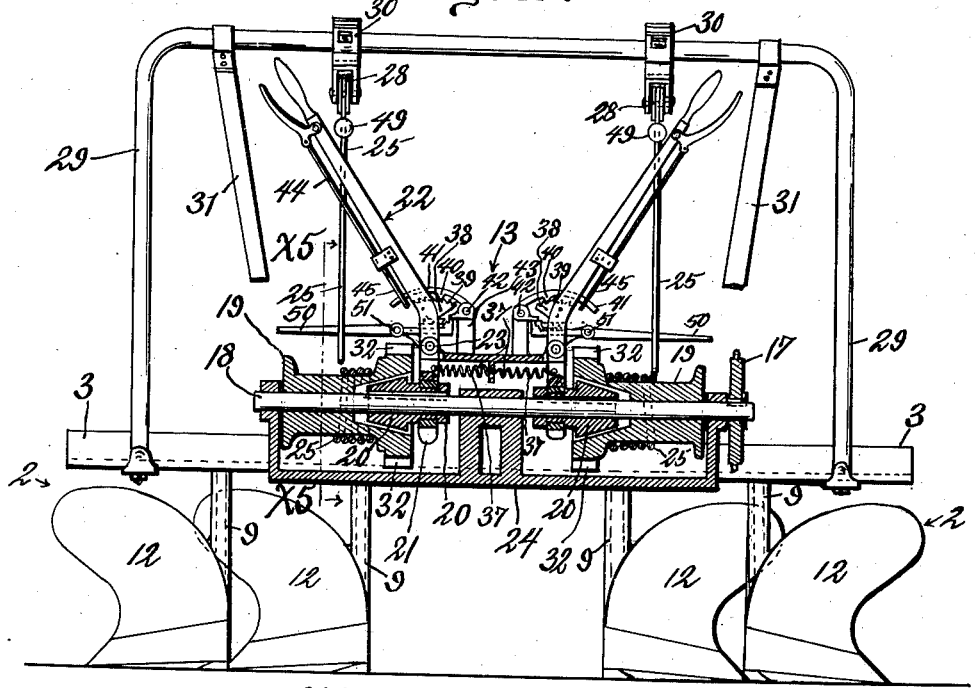
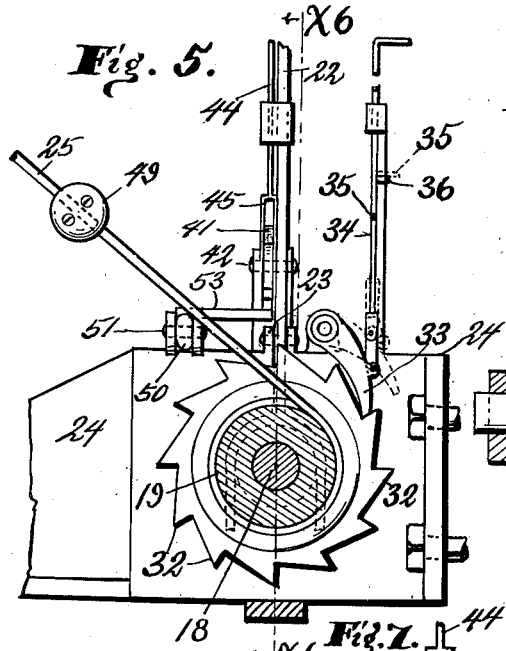
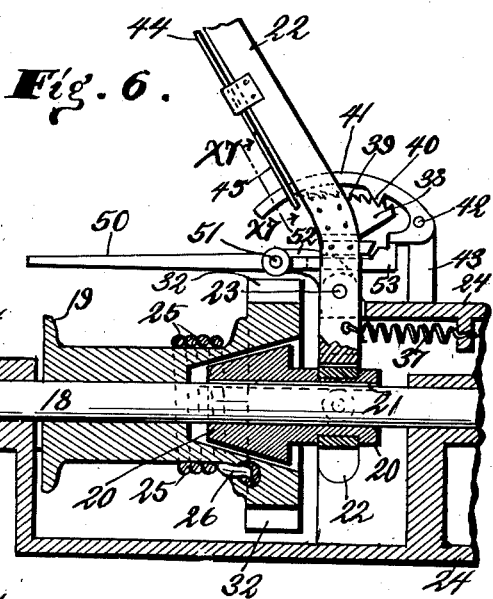
INVENTOR.
William H. Stark.
BY James R. Townsend
his ATTORNEY.
Witness:
W. M. Gentle.

Oct. 19, 1926.
W. H. STARK
1,603,993
AUTO FIELD MACHINE
Filed Oct. 16, 1922  3 Sheets-Sheet 3
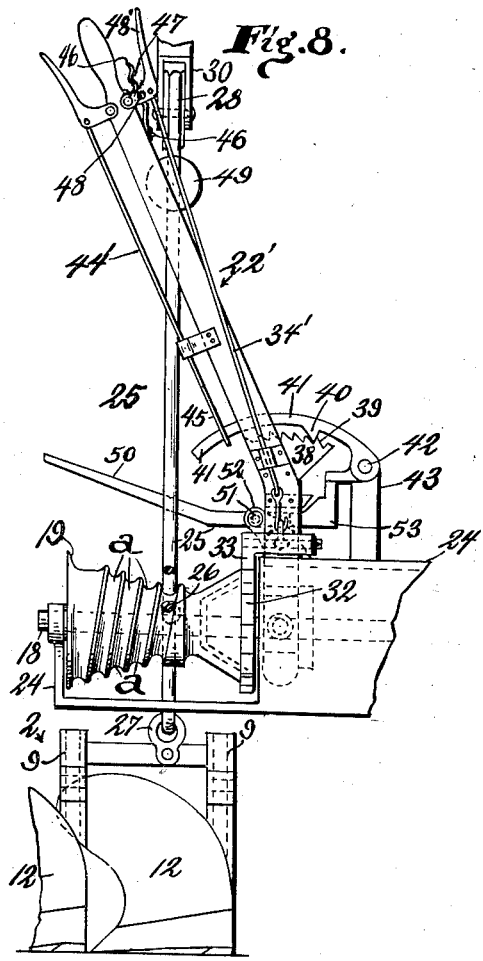
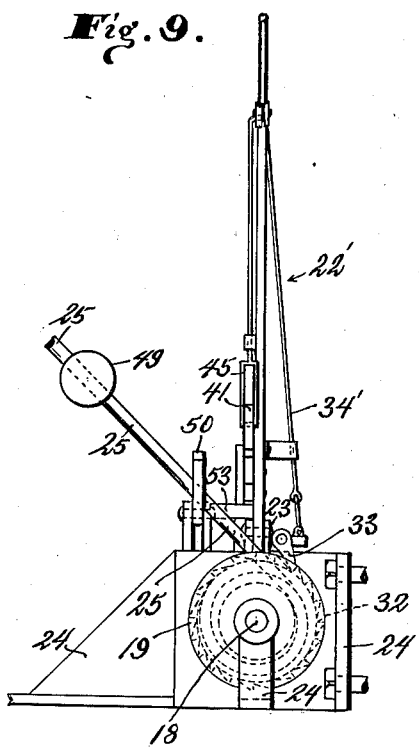
INVENTOR.
William H. Stark.

Patented Oct. 19, 1926.

1,603,993

UNITED STATES PATENT OFFICE.

WILLIAM H. STARK, OF LOS ANGELES, CALIFORNIA.

AUTO FIELD MACHINE.

Application filed October 16, 1922. Serial No. 594,812.

This invention includes an equipment comprising a standard tractor with ground working implements and means whereby said implements may be easily and more effectively carried and adjusted with relation to said tractor and the ground.

An object is to provide means whereby ground working implements connected to a tractor may be more easily and quickly raised and lowered relative to the ground.

Another object is to provide improved means whereby ground working implements connected to a tractor may be elevated and held in elevated position or supported by such elevating means.

An object is to provide means whereby ground working implements attached to a tractor may be elevated to various predetermined heights and will invariably be automatically elevated to a predetermined height.

An object is to dispense with auxiliary tractor driven carriers for ground working implements.

Another object is to provide means whereby ground working implements connected to a tractor may be elevated by the automotive means of said tractor at any time when the tractor engine is running.

I provide a tractor with ground working implements so mounted that they can be made to reach into close contact, so that small farms may be successfully and practically worked with tractors.

Another object is to provide means whereby ground working implements may be attached to and drawn by the tractor and which will permit such tractor to be driven forward or backward unhampered by such ground working implements.

An object is to provide means to minimize the amount of unplowed ground and the number of dead furrows in tractor-plowed fields. This I accomplish by providing a tractor with two independent and alternative plow devices on opposite sides of the mid-line of the tractor, and with means whereby the sets on opposite sides of the middle draft line may be intermittently and selectively thrown into and out of working position.

Other objects, advantages and features of invention may appear from the accompanying drawings, the subjoined detail description and the appended claims.

The accompanying drawings illustrate the invention.

Fig. 4 is an enlarged section on irregular line $x^4$—$x^4$, Fig. 2.

Fig. 5 is an enlarged section on line $x^5$, Fig. 4.

Fig. 6 is a section on irregular line $x^6$—$x^6$, Fig. 5.

Fig. 7 is an enlarged section on line $x^7$, Fig. 6.

Fig. 8 is a fragmental side elevation of a preferred form of the elevating mechanism.

Fig. 9 is a side view from the left hand side of Fig. 8; parts being broken away to contract the view.

Figure 1:
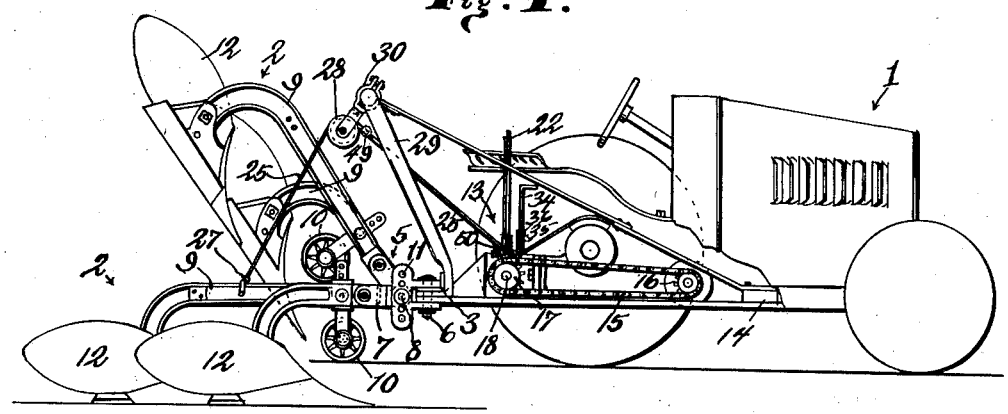
Figure 1 is a side elevation of a machine constructed in accordance with this invention; the ground working implements being shown in the form of two side pairs of plows, one pair being in working and the other in elevated position. Parts are broken away to more clearly show certain parts of the construction, and the ground and furrow levels being shown by straight horizontal lines.

The numeral 1 indicates a tractor, which may be of any suitable character. Any suitable ground working means as the plow 2 or other implement may be pivotally connected to the draw bar 3 which is secured to and extends laterally from the tractor. The draw bar 3 is provided with holes 4 to which the clevis 5 may be pivotally connected by means of a king bolt 6.

The link 7 is pivotally connected to the clevis 5 by the bolt 8. The plow beam 9 is pivotally connected to the link 7. The pivotal movement of such plow beam in relation to the link 7 is limited to the extent of the up and down play of the end of the plow beam and of the link 7.

The depth guide 10 secured to the plow beam 9, together with adjustment of the link 7 in the holes 11 of the clevis 5, determines the depth to which the plows 12 enter the ground when the elevating means 13 are released.

The lifting means or elevating mechanism 13 is mounted on the tractor frame 14 and is connected direct to the tractor engine, not shown, by means of a flexible connection shown as a chain 15 and the gear 16. The chain 15 continuously drives the gear 17 during operation of the tractor engine, and said gear 17 is secured to one end of the shaft 18. The shaft 18 has mounted at each end thereof clutches 19', 19'', the construction of each being the same; only one will be described.

The external cone clutch member 19 rotatably mounted on the shaft 18 is adapted to cooperate with the internal cone clutch member 20 which is non-rotatably, slidably mounted on the shaft 18 by any well known means such as the key 21. Lever 22 is pivotally connected at 23 to the housing 24 in which the elevating mechanism is mounted, and is adapted to shift the internal clutch member 20 into engagement with the external or normally stationary clutch member 19. A flexible connection as the cable 25 is secured at one end as at 26 to the external clutch member 19 that is adapted to be wound therearound, and is secured at its other end to the ground working implement as at 27.

Said cable 25 operates over a pulley 28 which is supported by the supporting member 29 that is fixed to the draw bar 3. Said pulley is fixed to the supporting member in swivelled relation thereto by any well known means such as the swivel clamp 30.

Braces 31 maintain the supporting member 29 in rigid relation to the draw bar 3, and the tractor frame 14.

The external clutch member 19 has at one end, and integral therewith, the ratchet 32 with which the pawl 33 cooperates to hold the external clutch member 19 in a predetermined normally stationary position. The pawl 33 may be held out of engagement with the ratchet 32 by means of the lever 34 which is connected to the pawl 33, and has secured thereto the pin 35 that is adapted to rest on the lug 36, when the lever 34 is raised and given a half turn as shown in dotted lines, Fig. 5, or by finger clamp 48, Fig. 8.

The clutch members 19 and 20 are normally held out of engagement by the resistive spring 37 which is connected to the housing 24 and lower end of the lever 22 and thus forms a resistive clutch. A sector plate 38 having notches 39 is fixed to the lever 22 and such notches are adapted for engagement with the tooth 40 carried by the arm 41 which is pivotally connected as at 42 to the upright 43 that is secured to the housing 24. The hand operated rod 44 has at its end a slot 45 through which the arm 41 passes. The tooth 40 may be disengaged from the notches 39 of the sector plate 38 by raising the rod 44.

Referring to Figs. 8 and 9, the external clutch member 19' is mounted on the shaft 18' and is corrugated and tapered as indicated at $a$ on its outer surface which forms a drum. The cable 25 is adapted to ride in the corrugations $a$. The lever 22' has mounted on one side thereof, a rod 44' which is operated by the finger clamp 44'' and operates the arm 41; and also has the rod 34' mounted on the other side thereof, which operates the pawl 33. A spring 46 is fixed to the lever 22' and is provided with notches 47 which engage the pin 48 that is fixed to the finger clamp 48' to hold the pawl 33 out of engagement with the ratchet 32 when the ground working implement is lowered to operative position.

Figure 2:
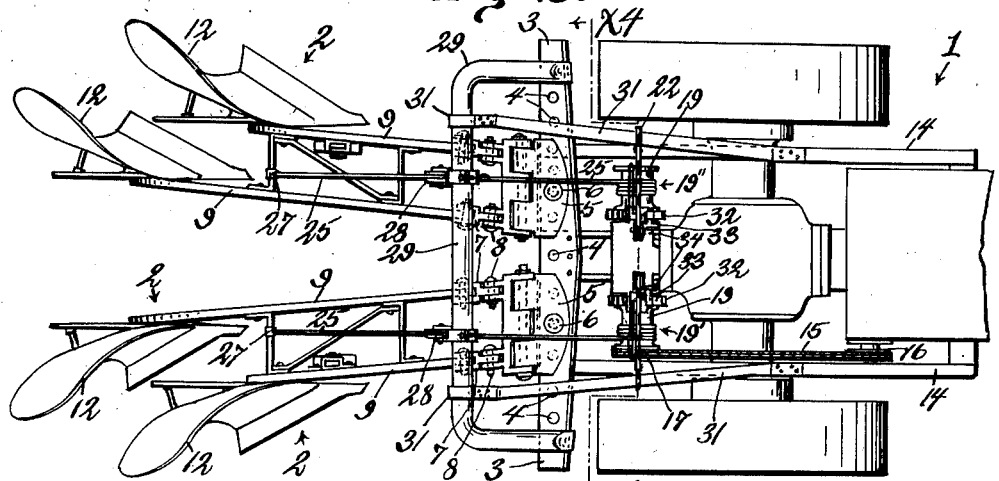
Fig. 2 is a fragmental plan, on enlarged scale, of the device shown in Fig. 1; all the plows being down.

In the foregoing I have described the apparatus as having but a single ground working implement attached thereto but the device may be equipped with only one or with more than one ground working implement as desired. In Figs. 1, 2 and 4 I have shown a right and a left hand gang plow attached to the draw bar, the attaching means and the elevating means for each being the same. The description of one will suffice for the other.

Figure 3:
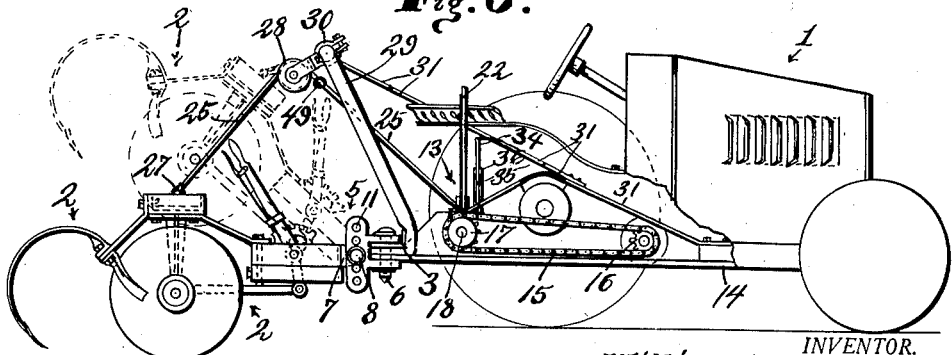
Fig. 3 is a side elevation similar to Fig. 1 but showing a disk and spring tooth harrow attached to the tractor. Dotted lines show the ground working implement in elevated position.

In practice the lifting mechanism 13 and the draw bar 3 are connected to the tractor frame 14. The shaft 18 is so connected to the tractor engine, not shown, that it is driven directly therefrom and is rotated at all times during engine operation. Suitable ground working implements 2 are connected to the draw bar in the desired position and regulated as to depth. The flexible connection 25 is connected to the ground working implement as at 27. The tractor engine is started, and the ground working implements may be raised by moving the lever 22 so that the clutch members 19 and 20 engage with each other, as will be hereafter more fully explained. The lifting mechanism will now be operated, and the ground working implements thereof lifted clear of the ground as shown in the elevated positions in Figs. 1 and 3, and the tractor will be operated in the ordinary manner.

When the ground working implements are in use and it is desired to elevate them the lever 22 is operated to cause engagement of the clutch members; and the outer clutch member or drum will be rotated, winding the connection 25 thereon which draws the ground working implement out of the ground.

A stop in the form of a split ball 49 may be secured at a predetermined position on the cable 25, and as the cable is wound upon the drum 19, a predetermined distance, and the ground working implements thus raised to a predetermined height, the stop 49 will engage the lever 50 which extends along and over the drum 19 and said lever 50 is pivoted at 51 to an arm 52 that is secured to the housing 24 and said lever 50 is provided with an extension 53 that contacts with the arm 41 and raises said arm 41 so that the tooth 40 is disengaged from the teeth 39 of the sector plate 38. The spring 37 will then automatically disengage the clutch members so as to stop further winding of the cable on the drum 19; the pawl 33 having in the meantime been released so that it will engage the ratchet 32 and prevent retrograde movement of the ground working implement and drum 19.

To lower the plows or ground working implements to working position, the pawl 33 is released from engagement with the ratchet 32 by operation of the lever 34 or rod 34', after which they will lower by gravity.

An advantage in having the external clutch member or drum 19' tapered is that when the lifting operation is started, a greater leverage is obtained; and the farther the ground working implement is elevated, the less resistance it accords; and as the drum increases in diameter the elevating operation is more quickly completed.

An advantage arising from the clevis 5 connecting the ground working implement to the draw bar being provided with a broad surface which engages the draw bar is that the ground working implement is held in a normal upright working position without the aid of wheels or other means of balance.

An advantage arising from interposing the link 7 between the clevis 5 and the plow beam 9 is that this enables the tractor to pass over rough or uneven ground without affecting the travel of the plow.

I claim:

1. The combination with a tractor having an engine; of ground working means pivotally connected to said tractor; and means for lifting said ground working means; said lifting means mounted on said tractor and connected to said ground working means; clutch members interposed directly between said lifting means and said engine and operable by power from said engine; resilient means tending to hold said clutch members apart; means to force said clutch members into operative engagement; means to automatically lock said clutch members in engagement with each other to elevate said ground working means; and means to automatically release said locking means when said ground working means have been lifted to a predetermined elevation; and means to hold said ground working means in said predetermined elevation and means for releasing said holding means.

2. A tractor having an engine; ground working means pivotally connected to said tractor; lifting means mounted on said tractor and connected to said ground working means; a shaft continuously rotated during operation of said engine; an internal clutch member driven by said shaft; an external clutch member adapted to be engaged by said internal clutch member and being provided with a tapered and corrugated outer surface forming a drum; a flexible element connected to said external clutch member and said ground working means and being adapted to be wound on said corrugated drum to elevate and to progressively accelerate the elevation of said ground working means; a stop attached to said flexible means to automatically disengage said clutch members when said ground working means have been raised to a predetermined position; ratchet attachments on said drum for holding said ground working means in such elevated position; and manually operated means for releasing said holding means to lower said ground working means.

3. In a machine of the character set forth the lifting mechanism substantially set forth comprising a housing; an internal clutch member; an external clutch member adapted to be engaged and rotated by said internal clutch member; flexible means connected at one end to said external clutch member and adapted to be connected at its other end to an implement to be lifted; a lever having a notched sector plate fixed thereto pivotally connected to said housing and adapted to relatively move said clutch members to engagement with each other; an arm pivotally connected to said housing and having a tooth adapted to engage the notches in said sector plate to hold said clutch members in engagement; and means to automatically release said tooth from the notches in said sector plate to permit disengagement of said clutch members when the implement has been lifted to a predetermined position.

4. The combination with a tractor having an engine; of ground working means pivotally connected to said tractor; lifting means composed of a winding drum and lifting cable; mounted on said tractor and connected to said ground working means; clutch members interposed between said engine and said lifting means and operable by power from said engine and adapted when both of said clutch members are held in operative engagement to operate said lifting means; resilient means tending to hold said clutch members apart; a lever having two finger clamps with ratchet pawls attached and adapted to force and to automatically lock said clutch members in engagement; a finger clamp adapted to unlock and release said clutch members as desired, a ratchet pawl adapted to lock and retain said lifting cable as described, and a finger clamp adapted to unlock and release said lifting cable to lower said ground working means.

5. The combination with a tractor having an engine; of ground working means pivotally connected to said tractor; an external and internal clutch member, a winding drum integral with said external clutch member; a flexible element connected to and adapted to be wound on said drum and having its other end connected to and adapted to lift said ground working means; said clutch members operable by power from said engine and adapted when both clutch members are held into engagement with each other to operate said winding drum; spring means tending to hold said clutch members apart; an operative lever with ratchet attachments, said operative lever and attachments being adapted to force and simultaneously lock said clutch members into operative engagement with each other to elevate said ground working means, means to automatically unlock and release said clutch members from operative engagement when said ground working means have been elevated to a predetermined height, ratchet attachments connected to said winding drum adapted to hold said ground working means in said predetermined elevation; and a movable stop on said flexible lifting means to vary the predetermined elevation; a finger clamp with ratchet attachments connected to said operative lever to release said holding means.

6. The combination with a tractor having an engine; of ground working means pivotally connected to said tractor; a lifting mechanism for elevating said ground working means comprising a winding drum and a lifting cable mounted on said tractor; a clutch having clutch members operable by power from said engine; resilient means tending to hold said clutch members apart, means to force said clutch members into operative engagement with each, means to automatically lock said clutch members in engagement to operate said lifting mechanism; a lever having two finger clamps attached, said lever and finger clamps having ratchet attachments, said lever being adapted and arranged to operate said clutch and said lifting mechanism to elevate said ground working means to various heights as desired; one of the finger clamps being adapted to release the lock that holds the lever with the clutch in operative position, and the other finger clamp being adapted to release the lock that holds the plow in raised position; means to hold said ground working means at various heights, and means to lower said ground working means from various heights as desired.

In testimony whereof, I have hereunto set my hand at Los Angeles, California, this 6th day of October, 1922.

WILLIAM H. STARK.